June 13, 1944.   H. G. HAMILTON   2,351,508
ELECTRIC MOTOR CONTROL SYSTEM
Filed May 8, 1943
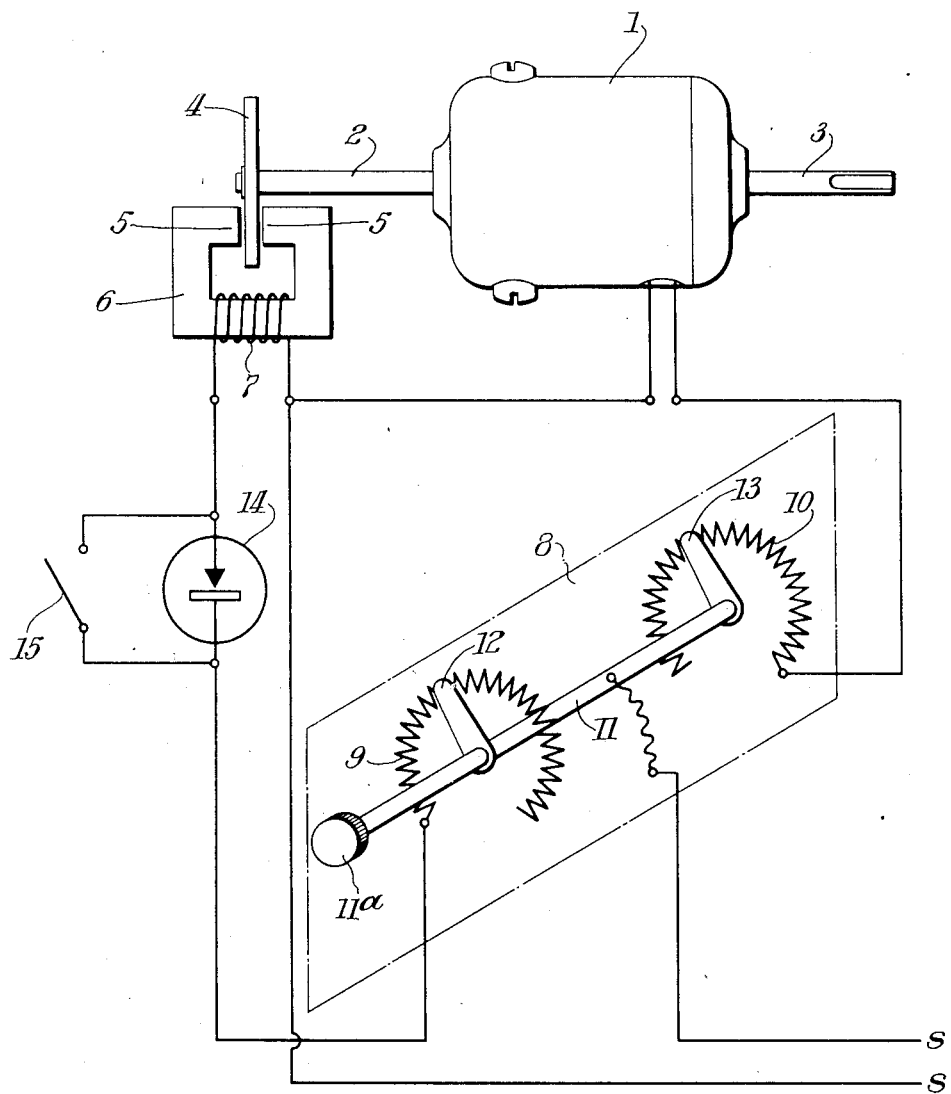
Inventor
Hugh G. Hamilton
By John F. Heine
Attorney
Witness:
Godfrey Pecina Patented June 13, 1944

2,351,508

UNITED STATES PATENT OFFICE 2,351,508

ELECTRIC MOTOR CONTROL SYSTEM

Hugh G. Hamilton, Baldwin, N. Y., assignor to The Singer Manufacturing Company, Elizabeth, N. J., a corporation of New Jersey Application May 8, 1943, Serial No. 486,127

6 Claims. (Cl. 171—229)

This invention relates to an electric motor control system for adjusting the speed of a series commutator-type motor fed from either a direct or an alternating current supply.

More particularly, this invention finds its greatest utility when used with small fractional horsepower series motors running under light loads.

It is difficult to control the light load speed of a series motor by series impedance variation over a wide speed range. This is apparently due to the large impedance values necessary and to the poor speed regulation produced thereby.

An object of this invention is, therefore, to provide an electric motor speed control system which shall have a comparatively wide speed range relative to the amounts of impedance required to be placed in series with a motor.

A further object of this invention is to provide a motor speed control system in which the speed will be less responsive to load fluctuations.

Another object of this invention is to provide a motor speed control system in which the motor speed shall be substantially independent of ordinary fluctuations in the voltage of the supply.

With the above and other objects in view as will hereinafter appear, the invention comprises the combination and arrangement of parts hereinafter set forth and illustrated in the accompanying drawing of a specific embodiment of the invention and the advantages attained thereby will be readily understood by those skilled in the art.

The single figure of the drawing is a schematic arrangement of parts showing an example of my invention.

In the drawing, a commutator motor 1 of the series wound type is provided with a shaft extension 2 in addition to a regular power output shaft 3. Secured to said shaft extension 2, for rotation therewith, is a disc 4 made of copper, aluminum or any suitable current-conducting material. Disc 4 is arranged for rotation between the poles 5 of an electromagnet 6 carrying the exciting winding 7. The disc 4 and associated electromagnet 6 form an eddy-current brake for the motor 1.

A dual rheostat 8 is provided with two resistance elements 9 and 10 which are conjointly controlled by a single actuating element 11 having a control knob 11ᵃ controlling the respective contact fingers 12 and 13.

The motor 1 is connected, as shown, to a source of supply s—s in series with the adjustable resistance 10 while the exciting winding 7 for the eddy-current brake is connected to said source s—s in series with the adjustable resistance 9. The connections are so made that movement of the actuating element 11 causes an increase in one resistance value and a decrease in the other resistance value and vice versa.

A rectifier 14, provided with a by-passing switch 15, is placed in series with the exciting winding 7 and the resistance 9. This adapts the system for satisfactory operation from either an alternating or a direct current source and insures that the flux field produced between the poles 5 shall be unidirectional. In operation from an alternating current supply, the switch 15 is placed in open position which allows rectifier 14 to supply unidirectional current to the winding 7. When operating from a direct current supply, the rectifier is not required and may be shunted out of the circuit by closing the switch 15.

When the element 11 is moved to decrease the value of resistance 10, increased current is fed from the source s—s to the motor 1, increasing the torque and thereby the speed at which said motor rotates. Simultaneously, the value of resistance 9 is increased thus decreasing the current carried by the exciting winding 7 thereby reducing the counter-torque provided by the eddy-current disc 4 and thus also increasing the motor speed.

It will be understood that both of these resistance changes are additive as regards their effect on the motor speed. That is to say, removing resistance in series with the motor has an effect on the motor speed similar to that obtained by inserting resistance in series with the eddy-current brake winding 7.

The eddy-current brake serves as a controllable load for the motor 11, the magnitude of said load being adjusted by controlling the current in the exciting winding 7 of the electromagnet 6. The torque required to turn an eddy-current disc in a constant unidirectional flux field varies substantially directly as the square of the rotational speed. This is a particularly desirable load characteristic for holding the motor speed stable at any desired value because the torque necessary to produce a given speed change is relatively high.

Further, the arrangement according to the invention is particularly well adapted for maintaining a stable speed regardless of ordinary line voltage variation. This is due to the compensatory effect of the dual speed control employed. For example, a decrease in the line voltage at s—s decreases the torque supplied by the motor 1 and, in the absence of any other means of torque demand reduction, the motor speed would have to decrease until the required lower torque demand was reached. However, by employing the eddy-current brake, excited from the same source as the motor, a decrease in line voltage is accompanied also by a decrease in the torque demand of said brake, thereby reducing if not eliminating the speed change necessary to provide the desired lower torque. In effect, the variation in the torque demand of the eddy-current brake due to line voltage variation compensates for the variation in the available motor torque due to the same cause thus tending to hold the motor speed steady at the value set.

It will be understood that the respective values of impedances 9 and 10 need not be the same but may be independently made equal to any value which will produce the desired speed range.

From the foregoing description, it will be perceived that, by combining eddy-current braking control means with rheostatic speed control means through the agency of a dual control element which conjointly and inversely adjusts said respective means, I have provided an improved motor speed control system in which a relatively wide range of stable operating speeds may be obtained for a lightly loaded series commutator motor.

It will be obvious to those skilled in the art that the invention may, without departure from its essential attributes, be embodied in various specific forms other than that shown and described, which latter is to be considered in all respects as illustrative of the invention and not restrictive.

Having thus set forth the nature of the invention, what I claim herein is:

1. An electric motor control system comprising, in combination, a source of electric current, a series-wound commutator motor, a first impedance means for controlling the flow of current from said source to said motor, braking means for applying a counter-torque to said motor, a second impedance means for controlling the magnitude of said counter-torque, and means for actuating said first and second impedance means conjointly so that the respective impedance values may be simultaneously changed in opposite directions, whereby to control the speed of said motor.

2. An electric motor control system comprising, in combination, a source of electric current, a series-wound commutator motor, a first adjustable impedance for controlling the flow of current from said source to said motor, braking means for applying a torque in opposition to the torque of said motor, a second adjustable impedance for controlling the magnitude of said opposition torque, and means for actuating said first and second impedances by a common element so that the respective impedance values may be simultaneously changed in opposite directions, whereby to control the speed of said motor.

3. An electric motor control system comprising, in combination, a source of electric current, a series-wound commutator motor, a first impedance means connected in series with said source and said motor, braking means for applying a counter-torque to said motor, a second impedance means connected in series with said source and said braking means for controlling the magnitude of said counter-torque, and a common operating element for actuating said first and second impedance means conjointly whereby the respective impedance values may be simultaneously changed in opposite directions, whereby to control the speed of said motor.

4. An electric motor control system comprising, in combination, a source of electric current, a series-wound commutator motor, a first impedance means for controlling the flow of current from said source to said motor, electromagnet means for producing a unidirectional flux field, an eddy-current disc driven by said motor and rotatable in said flux field, a second impedance means for controlling the magnitude of said flux field, and means for actuating said first and second impedance means conjointly so that the respective impedance values may be simultaneously changed in opposite directions, whereby to control the speed of said motor.

5. An electric motor control system comprising, in combination, a source of electric current, a series-wound commutator motor, a first impedance means for controlling the flow of current from said source to said motor, braking means including an eddy-current disc driven by said motor to rotate within a flux field supplied by an electromagnet having a current-carrying winding, a second impedance means for controlling the flow of current from said source to said winding, and means for actuating said first and second impedance means conjointly so that the respective impedance values may be simultaneously changed in opposite directions, whereby to control the speed of said motor.

6. In an electric motor control system, a source of current, a commutator-type series-wound motor, a first adjustable impedance connected in series with said source and said motor, an electromagnet having opposed poles, a current-carrying winding applied to said electromagnet, a disc of current-conducting material rotatable by said motor between said opposed poles, a second adjustable impedance connected in series with said source and said winding, said first and second adjustable impedances being connected together for operation from a common actuating element so that the respective impedance values may be simultaneously changed in opposite directions to control the speed of said motor.

HUGH G. HAMILTON.